United States Patent
Shiv

(10) Patent No.: US 7,470,622 B2
(45) Date of Patent: Dec. 30, 2008

(54) FABRICATION AND USE OF POLISHED SILICON MICRO-MIRRORS

(75) Inventor: Lior Shiv, Hilleroed (DK)

(73) Assignee: Hymite A/S, Kgs. Lyngby (DK)

( * ) Notice: Subject to any disclaimer, the term of this patent is extended or adjusted under 35 U.S.C. 154(b) by 78 days.

(21) Appl. No.: 11/156,170

(22) Filed: Jun. 17, 2005

(65) Prior Publication Data

US 2006/0283836 A1   Dec. 21, 2006

(51) Int. Cl.
  *H01L 21/302*   (2006.01)
(52) U.S. Cl. .................. 438/690; 438/747; 438/748; 438/753; 216/24
(58) Field of Classification Search .......... 438/690, 438/748, 747, 753; 216/24
  See application file for complete search history.

(56) References Cited

U.S. PATENT DOCUMENTS

| | | | |
|---|---|---|---|
| 6,205,274 B1 * | 3/2001 | Zhou | 385/38 |
| 6,900,922 B2 * | 5/2005 | Aubuchon | 359/292 |
| 2002/0094152 A1 * | 7/2002 | Feierabend et al. | 385/18 |
| 2002/0181852 A1 * | 12/2002 | Husain et al. | 385/18 |
| 2003/0054646 A1 * | 3/2003 | Yotsuya | 438/689 |
| 2004/0008401 A1 * | 1/2004 | Szczepanek et al. | 359/290 |
| 2004/0145822 A1 * | 7/2004 | Pan et al. | 359/872 |

\* cited by examiner

*Primary Examiner*—Binh X Tran
(74) *Attorney, Agent, or Firm*—Fish & Richardson P.C.

(57) ABSTRACT

A method of fabricating silicon micro-mirrors includes etching from opposite sides of a silicon wafer with a polished surface on at least one of the opposite sides, to form silicon bars each having a parallelogram-shaped cross-section and including a portion of the polished surface. At least one of the silicon bars is mounted on a mounting surface. The polished surface of the silicon bar may be used to reflect optical signals.

18 Claims, 3 Drawing Sheets

FABRICATION AND USE OF POLISHED SILICON MICRO-MIRRORS

BACKGROUND

The disclosure relates to the fabrication and use of polished silicon (Si) micro-mirrors.

Micro-mirrors may be used, for example, in optical sub-assemblies. Examples of such applications includes Transmitter Optical Sub-Assembly (TOSA) devices in which an edge emitter laser is mounted on a platform and the optical beam, parallel to the substrate surface, needs to be redirected by about ninety degrees. The lateral dimensions for such mirrors can be in the range of 500 by 500 microns.

SUMMARY

The present disclosure describes a cost-effective method for fabricating micro-mirrors in high-volume using standard angle cut Si wafers as the raw material in a way that ensures high optical quality of the mirror surface.

In one aspect, a method of fabricating silicon micro-mirrors includes etching from opposite sides of a silicon wafer having a polished surface on at least one of the opposite sides, to form silicon bars each having a parallelogram-shaped cross-section and including a portion of the polished surface. One or more of the silicon bars are mounted on a mounting surface. The polished surface of the silicon bar may be used to reflect optical signals.

In various implementations, one or more of the following features may be present. For example, the etching may include performing an anisotropic etch. Thus, in some implementations, the etching may include using KOH as an etchant and may include simultaneously etching from the opposite sides of the silicon wafer. In some implementations, the etching may include simultaneously etching grooves in opposite sides of the wafer, wherein each of a pair of grooves in opposite sides of the wafer are slightly offset from one another so that, as the etching proceeds, the two grooves are merged together to form sides of the silicon bars. In some implementations, the etching may include etching V-grooves with their longitudinal axis parallel to the wafer's <110> planes. The polished surface of the wafer may be parallel, for example, to the wafer's <100> planes. The etching may expose a surface in the wafer, and the silicon bar may be mounted with the exposed surface facing the mounting surface. In other implementations, different etching techniques may be used.

Other features and advantages will be readily apparent from the following detailed description, the accompanying drawings and the claims.

DETAILED DESCRIPTION

Figure 1:
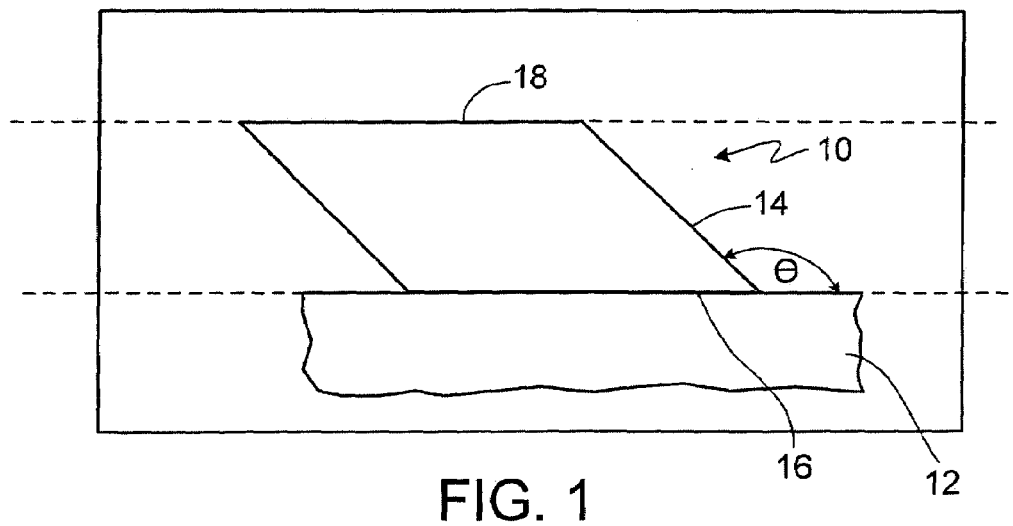
FIG. 1 illustrates an example of a silicon mirror on a sub-mount according to the invention.

As shown in FIG. 1, a discrete silicon micro-mirror 10 is mounted on an optical sub-mount 12. In some implementations, the area occupied by the mirror may be about 500 microns (μm) by 500 μm, with a thickness of about 300 μm. Different dimensions may be appropriate for other implementations. The mirror 10 includes an inclined polished surface 14 which may be coated, for example, with aluminum (Al) or gold (Au). The bottom surface 16 of the mirror may be coated, for example, with AuSn for attachment to a die (e.g., the optical sub-mount 12) through a reflow process. The upper surface 18 of the mirror also may be coated, for example, with Al or Au. In the illustrated example, the polished surface 14 of the mirror 10 forms an angle of about 45° with respect to the plane of the optical sub-mount 12. However, in some implementations, the polished surface may form a different angle with the substrate on which it is mounted.

The following paragraphs describe a process for fabricating a micro-mirror such as the one illustrated in FIG. 1.

The fabrication process is based on a anisotropic wet etch of a silicon wafer using, for example, potassium hydroxide (KOH) as the etchant. During etching, the <111> planes of the Si crystal are revealed due to the low etching rate in the direction perpendicular to those planes.

In one embodiment, the technique uses a Si wafer 20 (FIG. 2), which is cut such that the wafer's top surface will form a specified angle with those planes. In this case, the wafer's top surface is parallel to the <100> planes for standard wafers. For example, to achieve an angle of 45° or 64.4°, the angle between the wafer's top surface and the <100> crystal planes should be approximately 9.7°.

Figure 2:
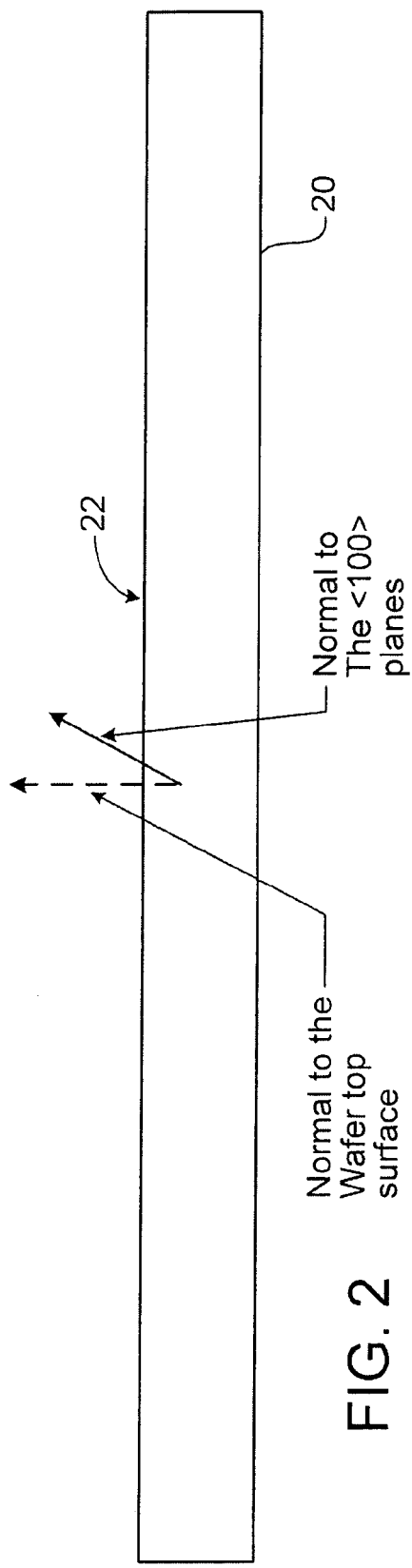
FIG. 2 illustrates a silicon wafer for fabricating the silicon mirrors.

At least one of the two sides of the wafer (i.e., the upper or lower surfaces) is polished to serve as the optical reflecting surface of the mirror. In the example of FIG. 2, the wafer's upper surface 22 is polished.

Figure 3:
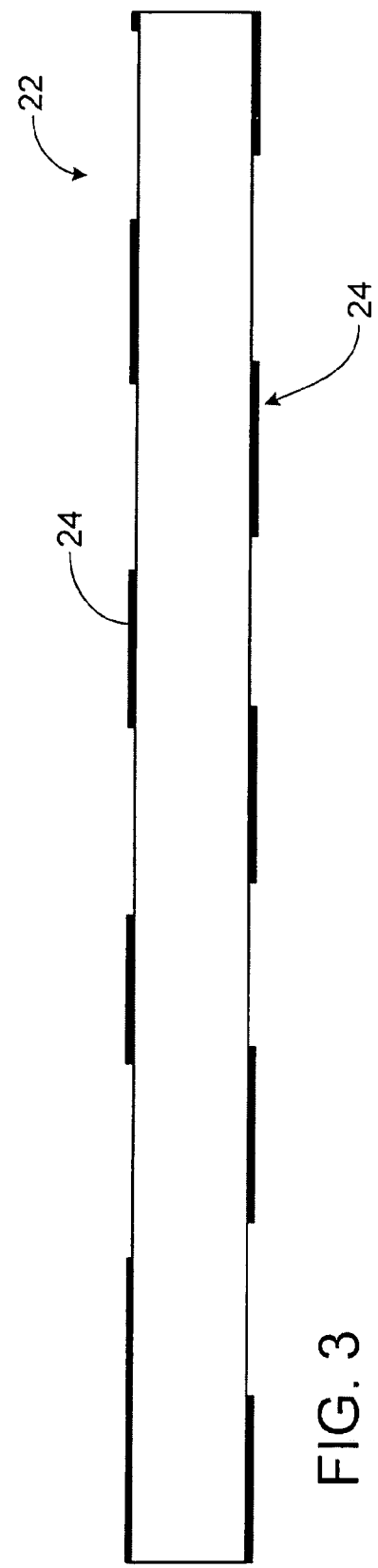
FIG. 3 illustrates the silicon wafer with an etch mask.
Figure 4:
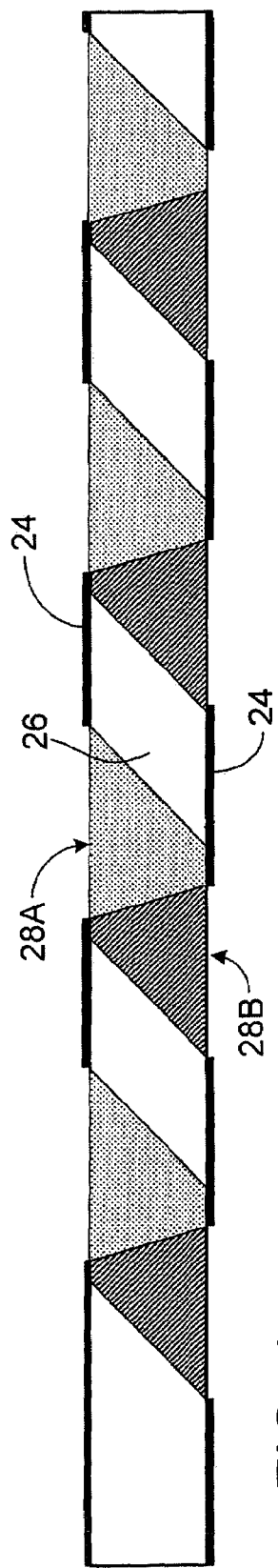
FIG. 4 illustrates the silicon wafer after etching v-grooves from both sides of the wafer.

V-grooves, with their longitudinal axis parallel to the wafer's <110> planes, are etched through the wafer from both sides of the wafer 20. As shown in FIG. 3, an oxide or nitrogen-oxide pattern 24, which is provided on both surfaces of the silicon wafer 20, may be used as the etching mask. The v-grooves 28A, 28B may be etched simultaneously from both sides of the wafer and may be slightly offset from one another so that, as the etching proceeds, two grooves etched from opposite sides of the wafer are merged together such that the remaining silicon bars 26 have a cross-section in the form of a parallelogram (see FIG. 4). As mentioned above, KOH may be used as the etchant. In some implementations, other etchants may be used. The angles of the parallelogram-shaped bars 26 are controlled by the crystal orientation of the wafer.

Figure 6:
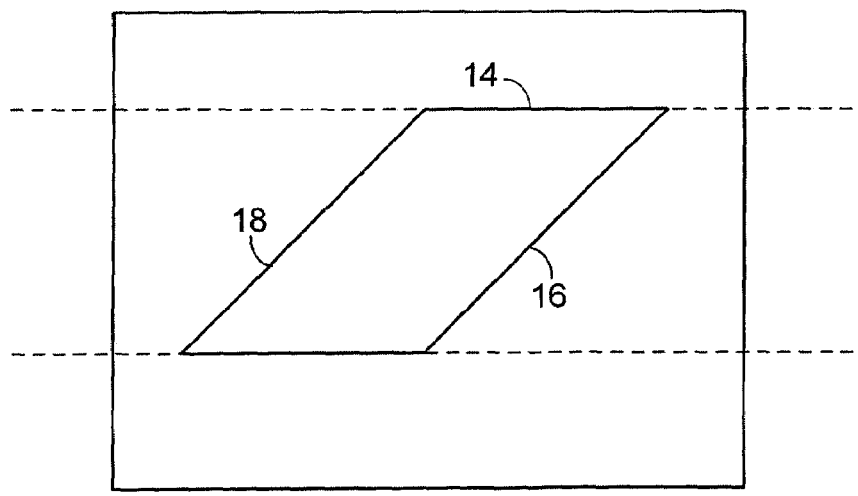
FIG. 6 illustrates a side view of the mirror as it is oriented on the wafer.
Figure 5:
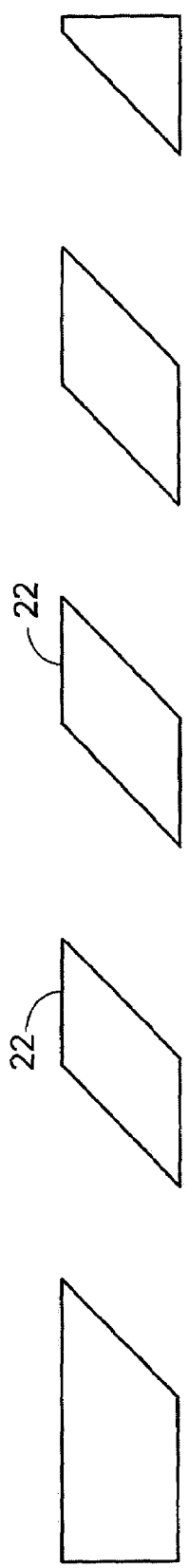
FIG. 5 illustrates the wafer structure after removal of the etch mask.

The mask pattern 24 may be stripped from the upper and lower surfaces of the wafer (FIG. 5). The wafer may then be diced to form individual silicon mirrors, in which the polished upper surface 22 serves as the reflective surface 14 (FIG. 6). Prior to attaching the mirror to the optical sub-mount, the surfaces of the mirror may be coated with Al, Au, AlSi, or another coating as appropriate. In addition, glue or solder may be deposited on the back-side 16 to enable attachment to the optical sub-mount. The mirror 10 is rotated, for example, by 45° or 135° from its orientation on the wafer (FIG. 6) prior to being attached to the sub-mount 12 (FIG. 1). The angle θ between the polished surface of the silicon bar and the mounting surface is around 135° (i.e., an obtuse angle).

The micro-mirrors may be used in various applications including as components in optical sub-assemblies.

Examples of such applications include Transmitter Optical Sub-Assembly (TOSA) devices in which an edge emitter laser is mounted on a platform and the optical beam, parallel to the substrate surface, needs to be redirected by about ninety degrees.

Other implementations are within the scope of the claims.

What is claimed is:

1. A method comprising:
   etching from opposite sides of a silicon wafer having a polished surface on at least one of the opposite sides, wherein etching the wafer forms silicon bars each having a parallelogram-shaped cross-section and including a portion of the polished surface;
   separating the silicon bars to form discrete micro mirrors; and
   mounting at least one of the separated silicon bars on a mounting surface.

2. The method of claim 1 wherein the etching includes simultaneously etching grooves from opposite sides of the silicon wafer to form the silicon bars.

3. The method of claim 1 wherein separating the silicon bars includes dicing the silicon wafer.

4. The method of claim 1 wherein the etching forms silicon bars having a non-rectangular parallelogram-shaped cross-section.

5. The method of claim 4 wherein the angle between the polished surface of the silicon bar and the mounting surface is between 90° and 180°.

6. The method of claim 4 wherein the angle between the polished surface of the silicon bar and the mounting surface is approximately 135°.

7. The method of claim 4 wherein the etching exposes a surface in the wafer, and wherein the at least one silicon bar is mounted with the exposed surface facing the mounting surface.

8. The method of claim 4 including using the polished surface of the silicon bar mounted on the mounting surface to reflect an optical signal.

9. The method of claim 4 including using the silicon bar mounted on the mounting surface as a micro-mirror.

10. The method of claim 4 including incorporating the silicon bar into an optical sub-assembly.

11. The method of claim 4 including incorporating the silicon bar into a Transmitter Optical Sub-Assembly device.

12. The method of claim 4 including incorporating the silicon bar into an assembly having an edge emitter laser for emitting an optical beam toward a polished surface of the silicon bar, wherein the optical beam is redirected by about ninety degrees upon reflection by the polished surface of the silicon bar.

13. The method of claim 4 wherein the etching includes performing an anisotropic etch.

14. The method of claim 13 wherein the etching includes using KOH as an etchant.

15. The method of claim 13 wherein the etching includes simultaneously etching from the opposite sides of the silicon wafer.

16. The method of claim 13 wherein the polished surface of the wafer is parallel to the wafer's <100> planes.

17. A method comprising:
   etching from opposite sides of a silicon wafer having a polished surface on at least one of the opposite sides and subsequently dicing the wafer to form discrete silicon bars each having a parallelogram-shaped cross-section and including a portion of the polished surface, wherein the etching includes simultaneously etching grooves in opposite sides of the wafer, wherein each of a pair of grooves in opposite sides of the wafer are slightly offset from one another so that, as the etching proceeds, the two grooves are merged together to form sides of the silicon bars; and
   mounting at least one of the silicon bars on a mounting surface.

18. A method comprising:
   etching from opposite sides of a silicon wafer having a polished surface on at least one of the opposite sides, wherein etching the wafer forms silicon bars each having a parallelogram-shaped cross-section and including a portion of the polished surface, wherein the etching includes etching V-grooves with their longitudinal axis parallel to the wafer's <110> planes;
   separating the silicon bars from one another; and
   mounting at least one of the silicon bars on a mounting surface.

* * * * *